United States Patent
Kline

(10) Patent No.: US 9,731,457 B2
(45) Date of Patent: Aug. 15, 2017

(54) SYSTEM AND METHOD FOR MINIMIZING WRINKLES IN COMPOSITES

(71) Applicant: The Boeing Company, Seal Beach, CA (US)

(72) Inventor: William T. Kline, Burien, WA (US)

(73) Assignee: The Boeing Company, Chicago, IL (US)

( * ) Notice: Subject to any disclaimer, the term of this patent is extended or adjusted under 35 U.S.C. 154(b) by 634 days.

(21) Appl. No.: 13/668,210

(22) Filed: Nov. 2, 2012

(65) Prior Publication Data
US 2014/0127473 A1    May 8, 2014

(51) Int. Cl.
*B29C 70/68*    (2006.01)
*B29C 70/54*    (2006.01)
*B29C 70/56*    (2006.01)
*B29C 33/42*    (2006.01)

(52) U.S. Cl.
CPC ............ *B29C 70/683* (2013.01); *B29C 33/42* (2013.01); *B29C 70/543* (2013.01); *B29C 70/56* (2013.01); *Y10T 156/1002* (2015.01); *Y10T 428/24628* (2015.01)

(58) Field of Classification Search
CPC ........ B29C 53/18; B29C 70/40; B29C 70/683
USPC .......................... 264/285, 286, 287; 156/196
See application file for complete search history.

(56) References Cited

U.S. PATENT DOCUMENTS

| | | | | |
|---|---|---|---|---|
| 2,967,796 A | * | 1/1961 | Raffel | B29C 49/44 156/177 |
| 3,118,527 A | * | 1/1964 | Lombardy | D02G 1/14 156/175 |
| 3,243,580 A | * | 3/1966 | Welsh | G11B 20/1419 329/314 |
| 3,349,157 A | | 10/1967 | Parsons | |
| 3,685,931 A | * | 8/1972 | Craven | B29C 53/28 264/286 |
| 3,798,299 A | * | 3/1974 | Gumm | B21D 39/031 264/249 |
| 3,816,984 A | * | 6/1974 | Neumann | 55/502 |
| 3,955,019 A | * | 5/1976 | Keith | 428/34.5 |
| 3,957,416 A | * | 5/1976 | Kaempen | 425/470 |
| 3,994,081 A | * | 11/1976 | Middleton | E01H 5/04 299/14 |

(Continued)

FOREIGN PATENT DOCUMENTS

EP    2433781    3/2012

OTHER PUBLICATIONS

VanClooster, "On the formability of multi-layered fabric composites," Presented at ICCM-17 17th International Conference on Composite Materials, Jul. 27-31, 2009, Edinburgh, UK. available at <http://www.iccm-central.org/Proceedings/ICCM17proceedings/Themes/Manufacturing/Composites%20FORMING/C1.5%20van%20Cloooster.pdf>.

(Continued)

*Primary Examiner* — Nahida Sultana

(57) ABSTRACT

A wrinkle mitigation system may include at least one tooling rod disposed against a tool surface at a location on the tool where a composite ply is configured to overlap the tooling rod. The tooling rod may have an elongated shape and may be generally oriented along a direction of wrinkle formation in the composite ply. The tooling rod may have a rod width that results in the composite ply assuming a corrugated shape when compaction pressure is applied to the composite ply.

27 Claims, 11 Drawing Sheets

(56) References Cited

U.S. PATENT DOCUMENTS

| | | | | |
|---|---|---|---|---|
| 3,995,081 | A * | 11/1976 | Fant | B29C 70/865 244/123.3 |
| 4,081,504 | A * | 3/1978 | Wenrick | B29C 47/025 264/171.21 |
| 4,126,659 | A * | 11/1978 | Blad | B29C 33/3814 156/189 |
| 5,183,597 | A * | 2/1993 | Lu | B29C 35/08 264/1.38 |
| 5,632,946 | A * | 5/1997 | Bacon, Jr. | B29C 39/148 156/285 |
| 5,843,355 | A * | 12/1998 | McCarville | B29C 70/345 156/197 |
| 5,882,462 | A * | 3/1999 | Donecker | B27N 3/10 156/205 |
| 5,919,543 | A * | 7/1999 | McCarville | B29C 70/345 156/182 |
| 6,071,458 | A * | 6/2000 | Mossi | B28B 3/12 264/294 |
| 6,110,407 | A * | 8/2000 | Murphy | B29C 33/3842 249/178 |
| 6,159,318 | A * | 12/2000 | Choi | B01D 29/012 156/167 |
| 6,254,812 | B1 * | 7/2001 | Goodridge | B29C 33/303 249/178 |
| 6,929,656 | B1 * | 8/2005 | Lennox | A61F 7/12 607/104 |
| 7,249,943 | B2 * | 7/2007 | Benson | B29C 70/388 425/374 |
| 7,717,694 | B2 * | 5/2010 | Coleman | B29C 70/44 425/389 |
| 7,943,076 | B1 * | 5/2011 | Hawkins | B29C 70/30 156/196 |
| 8,668,855 | B2 * | 3/2014 | Bradford | B29C 47/0028 264/177.12 |
| 9,272,767 | B2 * | 3/2016 | Stewart | B64C 1/064 |
| 2002/0189195 | A1 * | 12/2002 | McKague et al. | 52/783.19 |
| 2003/0079825 | A1 * | 5/2003 | Gardner | B29C 53/28 156/205 |
| 2004/0118546 | A1 * | 6/2004 | Bakken | D21F 1/0054 162/348 |
| 2005/0056362 | A1 * | 3/2005 | Benson | B29C 70/388 156/163 |
| 2009/0202767 | A1 | 8/2009 | Booker et al. | |
| 2010/0009126 | A1 * | 1/2010 | Leon | B64C 3/26 428/174 |
| 2010/0201045 | A1 * | 8/2010 | Schibsbye | B29C 70/543 264/511 |
| 2010/0258974 | A1 * | 10/2010 | Wallace | B29C 33/0044 264/262 |
| 2013/0020438 | A1 * | 1/2013 | Glynn et al. | 244/129.1 |
| 2014/0246149 | A1 * | 9/2014 | Kendrick et al. | 156/288 |
| 2015/0044430 | A1 * | 2/2015 | Lee et al. | 428/182 |
| 2016/0016366 | A1 * | 1/2016 | Robins | B29C 70/46 425/356 |

OTHER PUBLICATIONS

PCT/US2013/063680 International Search Report dated Jan. 8, 2014.

* cited by examiner

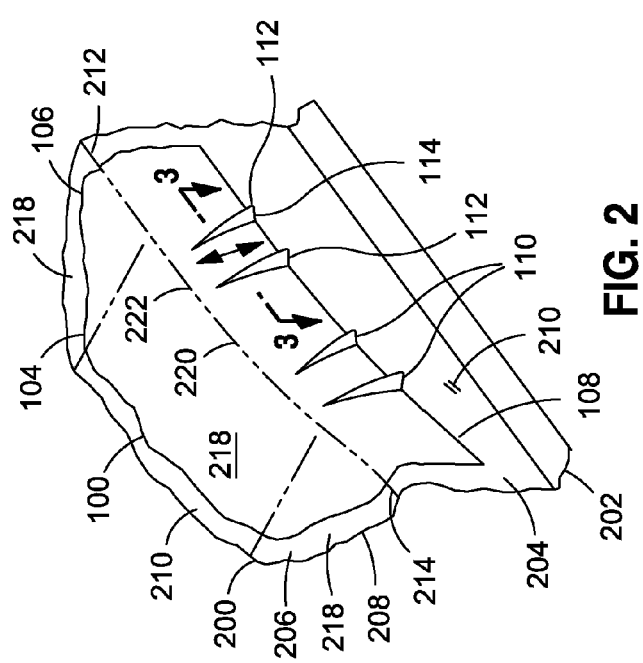
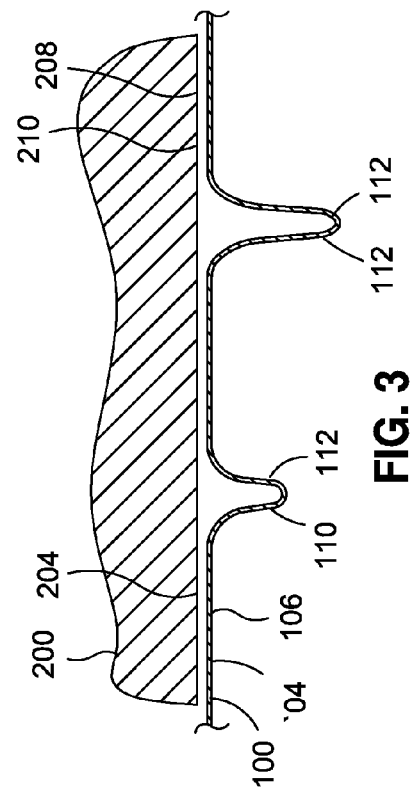
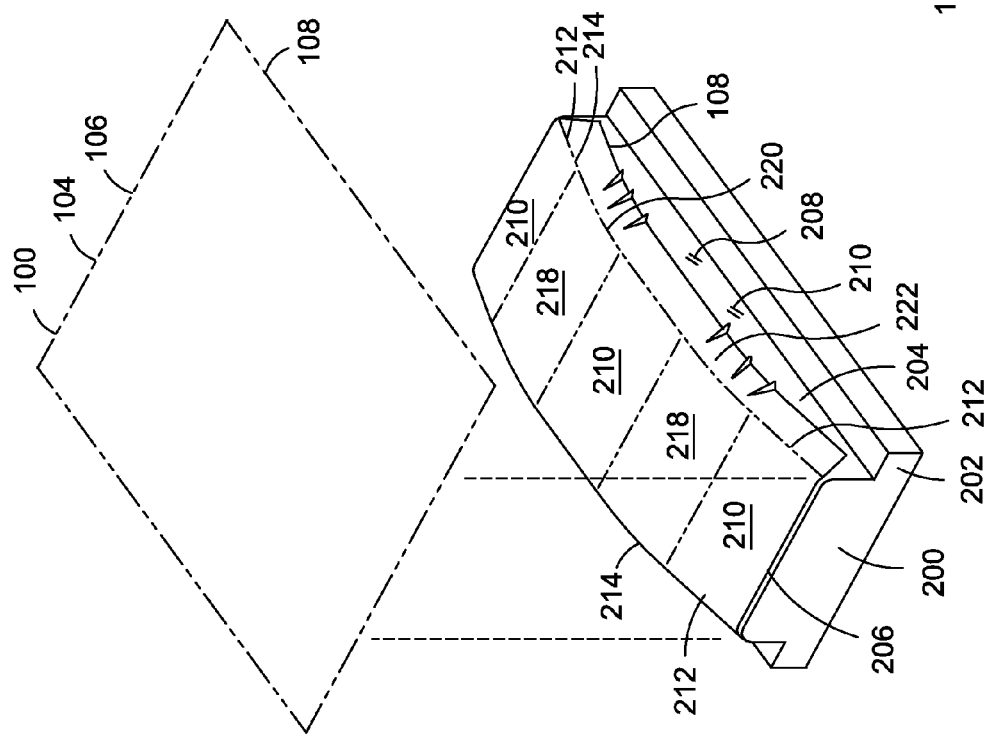
FIG. 1
FIG. 2
FIG. 3

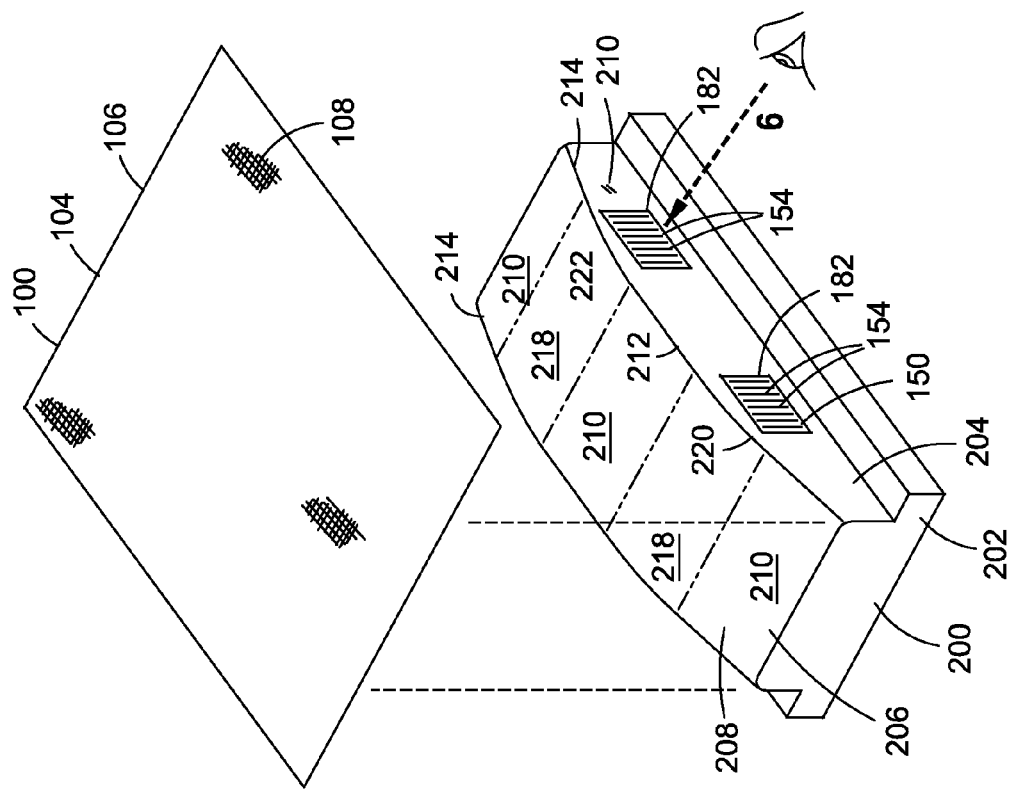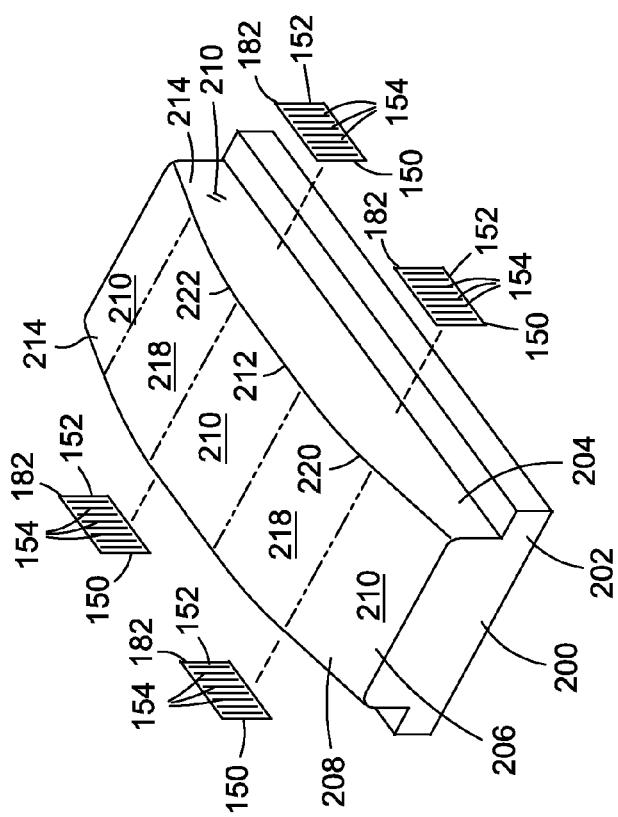

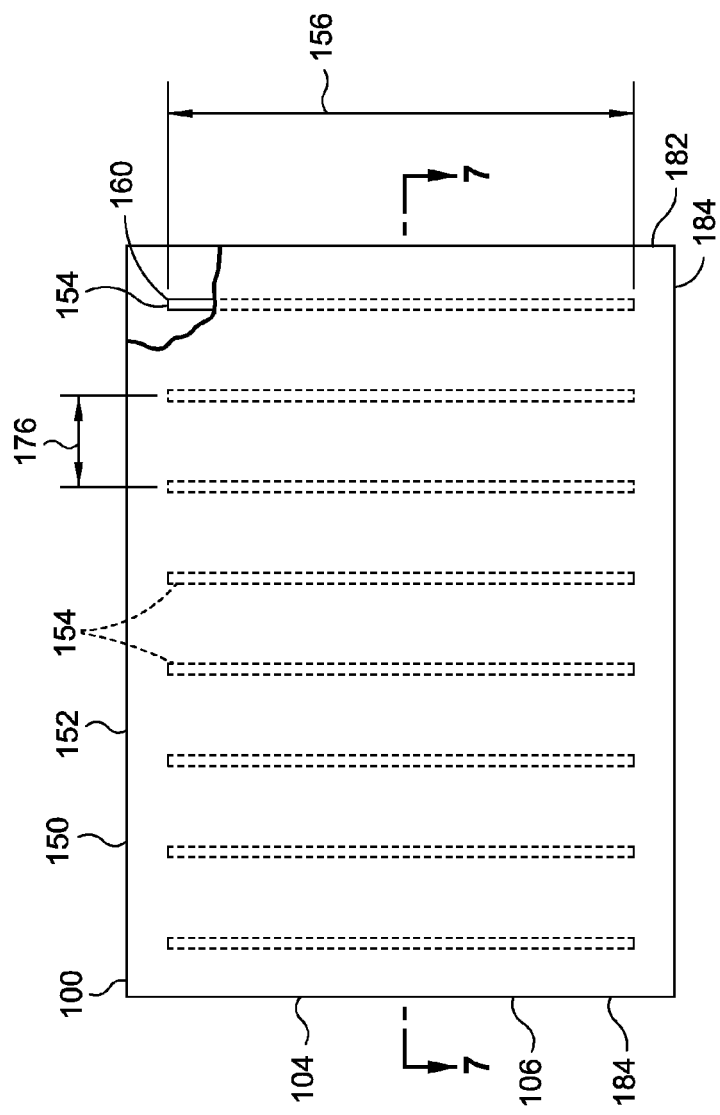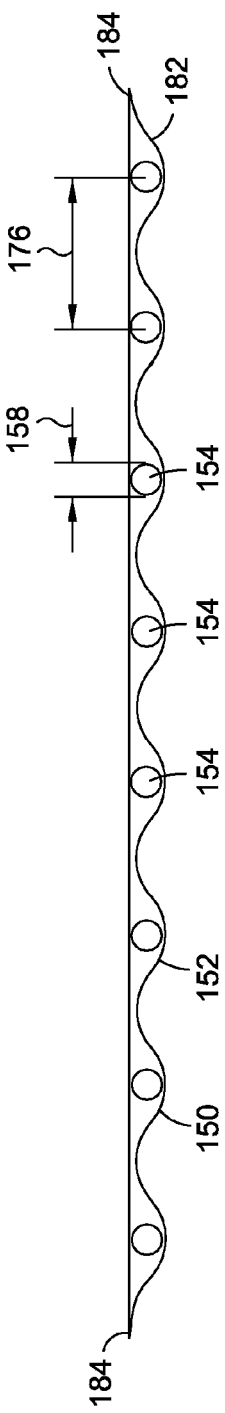
FIG. 6
FIG. 7

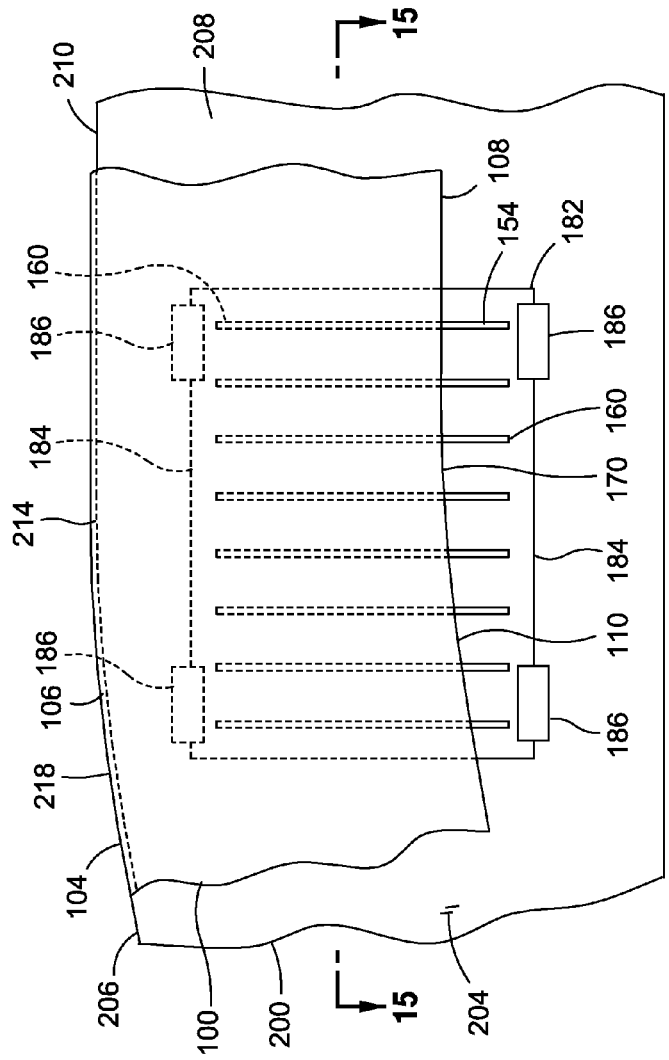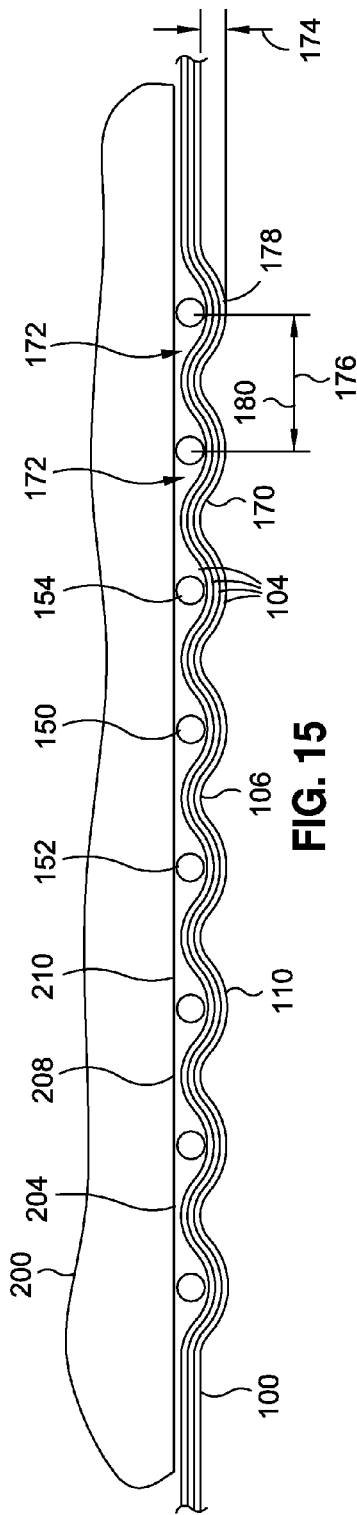
FIG. 14
FIG. 15

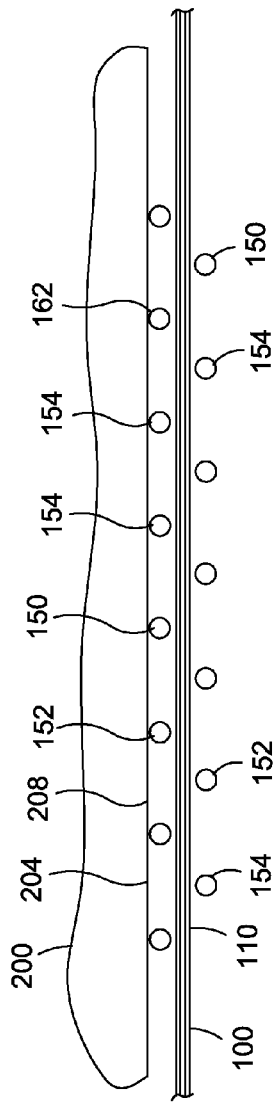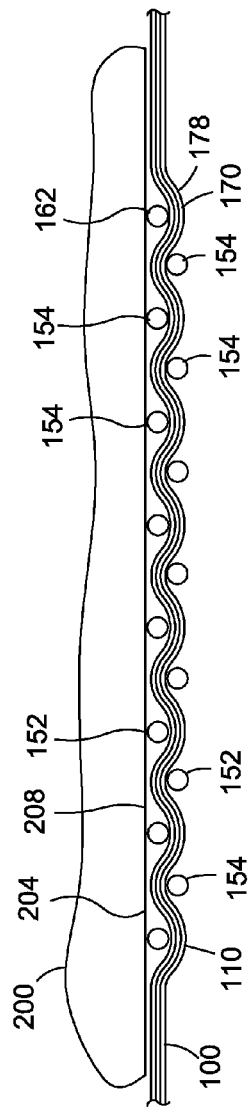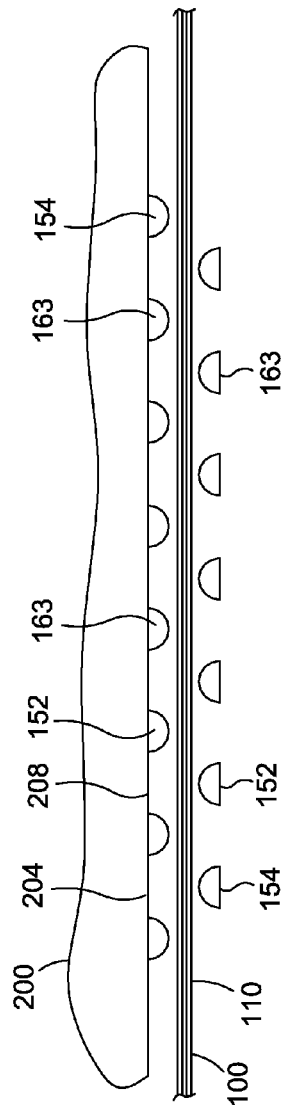

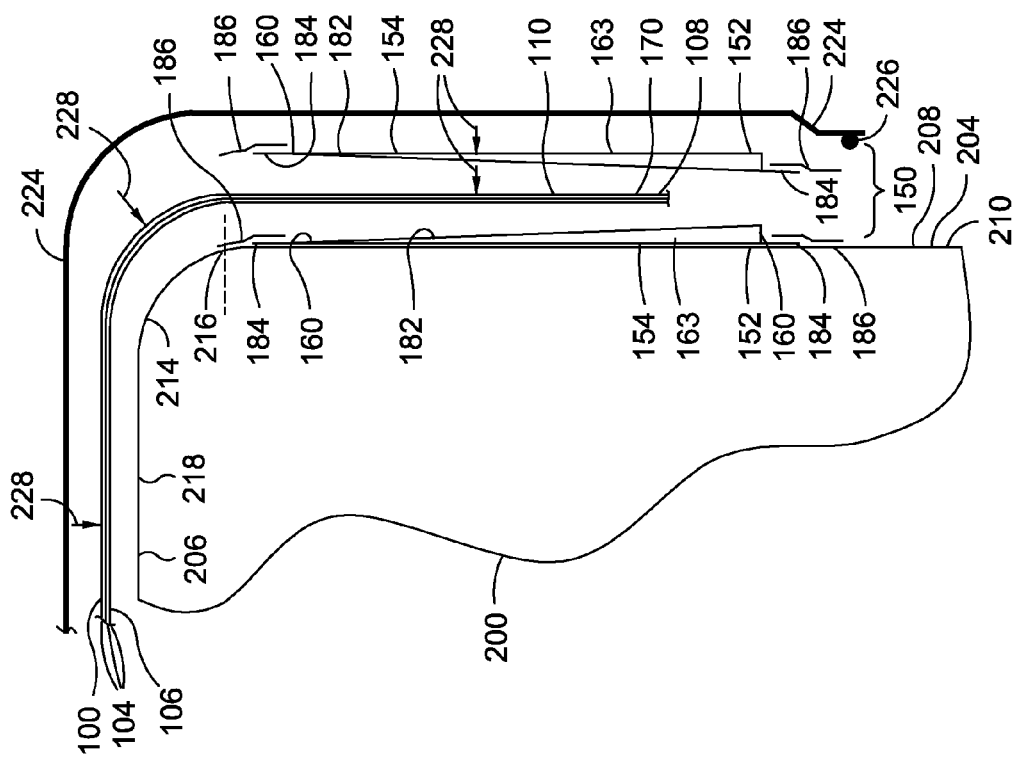

SYSTEM AND METHOD FOR MINIMIZING WRINKLES IN COMPOSITES

FIELD

The present disclosure relates generally to composites manufacturing and, more particularly, to forming composite material over a mold having an irregular geometric shape.

BACKGROUND

Composite structures are used in a wide variety of applications. In aircraft construction, composites are used in increasing quantities to form the fuselage, wings, and other components. During the process of forming a composite structure, one or more composite plies may be formed or draped over a tool surface. When a composite laminate is formed over a tool surface having an irregular geometric shape, excess ply material may build up at localized areas in the composite laminate. For example, excess ply material may occur in the composite laminate near regions of complex curvature on the tool surface.

The excess ply material may collect or bunch up resulting in uncontrolled wrinkle formation in the composite laminate. Areas of uncontrolled wrinkle formation in cured composite articles may require significant documentation and rework to bring the composite article to within design tolerances. In cases of excessive wrinkle formation, the composite article may be scrapped and a replacement article may be fabricated with a significant cost and schedule impact.

As can be seen, there exists a need in the art for a system and method for controlling wrinkling in composite laminates formed over tools having an irregular geometric shape or complex curvature.

SUMMARY

The above-noted needs associated with wrinkle formation in composite laminates are specifically addressed and alleviated by the present disclosure which provides a wrinkle mitigation system for controlling the formation of wrinkles in a composite ply. The system may include at least one tooling rod disposed against a tool surface at a location on the tool where a composite ply is configured to overlap the tooling rod. The tooling rod may have an elongated shape and may have a generally high rod length to rod width aspect ratio of 10 or more. The tooling rod may be oriented along a general direction of wrinkle formation in the composite ply. The tooling rod may have a rod width that results in the composite ply assuming a corrugated shape when compaction pressure is applied to the composite ply over the tooling rod.

In a further embodiment, disclosed is a wrinkle mitigation system for controlling the formation of wrinkles in a composite laminate. The system may include a tooling rod assembly that may be removably mounted to a tool surface at a location where a composite laminate is configured to overlap the tooling rod assembly. The tooling rods of the tooling rod assembly may have an elongated shape and may be generally parallel to one another and oriented generally along a general direction of wrinkle formation in the composite laminate. The tooling rods may have a rod width that results in the composite laminate assuming a corrugated shape when compaction pressure is applied to the composite laminate.

Also disclosed is a method for mitigating wrinkle formation in a composite ply. The method may include providing at least one tooling rod on a tool surface, and applying a composite ply over the tooling rod and the tool surface. The method may further include applying a compaction pressure to the composite ply, and forming the composite ply into a corrugated shape over the tooling rod.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of a composite tool having a composite ply draped over the tool;

FIG. 2 is a perspective view of the tool in an area of complex curvature and illustrating excess ply material resulting in uncontrolled wrinkle formation in the composite ply due to the complex curvature;

FIG. 3 is a sectional view of the composite ply taken along line 3 of FIG. 2 and illustrating the uncontrolled wrinkle formation;

FIG. 4 is an exploded perspective view of the tool and a wrinkle mitigation system prior to mounting to the tool;

FIG. 5 is a perspective view of the tool with the wrinkle mitigation system mounted to the tool sides adjacent to locations of complex curvature in the tool surface;

FIG. 6 is a plan view of an embodiment of a wrinkle mitigation system comprising a tooling rod assembly having a plurality of tooling rods covered by a protective film;

FIG. 7 is a sectional view of the tooling rod assembly taken along line 7 of FIG. 6;

FIG. 14 is a side view of a tooling rod assembly mounted to the tool and illustrating a composite laminate partially covering the tooling rod assembly;

FIG. 15 is a sectional view of the tool taken along line 15 of FIG. 14 and illustrating a corrugated shape generated in the composite laminate by the tooling rod assembly;

FIG. 18 is a sectional view of the tool illustrating a pair of the tooling rod assemblies and a composite laminate positioned therebetween;

FIG. 19 is a sectional view of the tool taken along line 19 of FIG. 17 and illustrating a corrugated shape generated in the composite laminate by the pair of tooling rod assemblies;

FIG. 20 is a sectional view of the tool illustrating a pair of the tooling rod assemblies having a half-cone shaped tooling rods and illustrating a composite laminate positioned between the tooling rod assemblies;

FIG. 21 is a sectional view of the tool illustrating a corrugated shape generated in the composite laminate by the half-cone shaped tooling rods;

FIG. 22 is an exploded sectional side view of a composite laminate draped over the tool and positioned between a pair of tooling rod assemblies.

DETAILED DESCRIPTION

Figure 8:
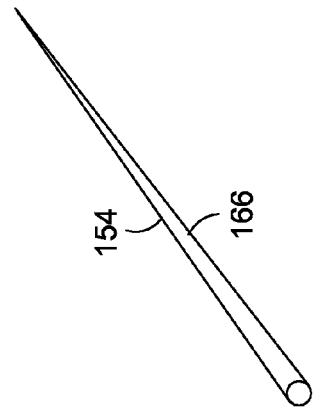
FIG. 8 is a perspective view of an embodiment of a tooling rod having a cylindrical shape.

Referring now to the drawings wherein the showings are for purposes of illustrating preferred and various embodiments of the disclosure, shown in FIG. 1 is a perspective view of a composite tool 200 having a composite ply 104 that may be applied over the tool 200. The composite ply 104 may be provided as a relatively flat or planar sheet of polymer matrix fiber-reinforced material 106. For example, the composite ply 104 may comprise pre-impregnated fiber-reinforced polymeric material (e.g., prepreg). However, the composite ply 104 may comprise a dry fiber preform (not shown) that may be infused with resin after the preform is applied to the tool 200.

The tool 200 may include a tool base 202 and tool sides 204 extending upwardly to a tool top 206. The tool top 206 and tool sides 204 may collectively include a plurality of tool surfaces 208 over which the composite ply 104 may be applied or formed. The tool 200 may include one or more irregularly shaped surfaces. For example, the tool 200 may include one or more planar surfaces 210 and one or more contoured surfaces 218. A contoured surface 218 may comprise a curved surface or a surface combining flats and curves. In an embodiment shown in FIG. 1, the contoured surface 218 may have a relatively large radius to provide a gradual transition between the angular orientations of the planar surfaces 210 located on opposing sides of the contoured surface 218. The juncture of the planar surfaces 210 with the planar tool sides 204 may represent a single curvature 212 in the tool 200. The juncture of the contoured surfaces 218 with the tool sides 204 may represent regions of complex curvature 220 or bi-directional curvature 222 in the tool 200.

Referring to FIG. 2, shown is a composite ply 104 or composite laminate 100 overlapping a portion of the tool 200 in a region of complex curvature 220. Regions of single curvature 212 are located on opposite sides of the region of complex curvature 220. When a relatively planar sheet of composite ply 104 material is formed over the regions of single curvature 212, the composite ply 104 material may generally lay flat against the tool side 204. When a planar sheet of composite ply 104 material is formed over a region of the complex curvature 220, excess ply material 110 may bunch up against the tool side 204.

Referring to FIG. 3, shown is a cross section of the tool 200 along the tool side 204 and illustrating excess ply material 110 that may occur in the composite ply 104. The excess ply material 110 may result in uncontrolled wrinkle formation 112. The uncontrolled wrinkle formation 112 may include localized bunching of the excess ply material 110 into folds or pleats of different heights. In addition, such folds or beads may be distributed non-uniformly along the composite ply 104. The fold or pleats may be oriented along a direction of wrinkle formation 4 that is generally parallel to the direction over which the composite play 104 is wrapped over the tool surfaces 208.

For example, FIG. 2 illustrates the uncontrolled wrinkle formation 112 comprising pleats of excess material having a lengthwise direction that is generally parallel to the direction of the wrapping of the composite ply 104 over the contoured surface 218 and the tool side 204. For the tool 200 configuration shown, the direction of wrinkle formation 114 may be perpendicular to a length along which a corner radius 214 extends between the contoured surface 218 and the tool side 204. In this regard, FIGS. 1-3 illustrate the generation of excess ply material 110 that may occur when a generally flat or planar composite ply 104 is formed over a surface of complex curvature 220 or irregular geometric shape. However, excess ply material may be generated with any tool configuration having a complex curvature of irregular geometric shape.

Referring to FIG. 4, shown is a wrinkle mitigation system 150 that may be applied to or mounted to a tool 200 prior to forming or applying a composite ply 104 over the tool 200. The wrinkle mitigation system 150 may comprise one or more tooling rods 154 that may be disposed against or mounted to one or more tool surfaces 208. For example, the wrinkle mitigation system 150 may comprise one or more tooling rod assemblies 152 that may be applied to a tool surface 208. Each one of the tooling rod assemblies 152 may include a plurality of tooling rods 154. Advantageously, the tooling rod assemblies 152 may uniformly distribute excess ply material 110 along a length of the composite ply 104, and may minimize or eliminate localized bunching of the excess ply material 110 into uncontrolled pleats or folds. As described below, the excess ply material 110 may be uniformly distributed when compaction pressure 228 is applied to the composite ply 104 and which may force the composite ply 104 over and in between the tooling rods 154. The compaction pressure 228 may cause the composite ply 104 to assume a corrugated shape 170 over the tooling rods 154.

Referring to FIG. 5, shown is the tool 200 with tooling rod assemblies 152 mounted to the tool sides 204. One or more of the tooling rod assemblies 152 may be disposed against a tool surface 208 at a location where a composite ply 104 is configured to overlap the tooling rod 154. One or more tooling rods 154 or tooling rod assemblies 152 may be positioned at a location on the tool 200 where excess ply material 110 may otherwise gather in an uncontrolled wrinkle formation 112 as described above. For example, one or more tooling rod assemblies 152 may be located adjacent to a region of complex curvature 220 on the tool 200. However, tooling rod assemblies 152 may be positioned at any location on the tool 200 and are not limited to regions of complex curvature 220.

In FIG. 5, a tooling rod 154 or a tooling rod assembly 152 may be removably mounted to the tool 200 such as by using a removable attachment device 186 such as an adhesive tape. However, one or more tooling rods 154 or tooling rod assemblies 152 may be permanently mounted to the tool 200. For example, one or more tooling rods 154 or tooling rod assemblies 152 may be integrally-formed with the tool 200. Although not shown, an integrally-formed tooling rod 154 or tooling rod assembly 152 may be machined into one or more tool surfaces 208 at a location on the tool 200 where excess ply material 110 is known to occur. In a further embodiment not shown, one or more tooling rods 154 or tooling rod assemblies 152 may be molded into a tool 200. For example, one or more composite tooling rods 154 may be molded into a tool 200 formed of composite material.

Referring to FIG. 6, shown is an embodiment of a wrinkle mitigation system 150 comprising a tooling rod assembly 152. The tooling rod assembly 152 includes a plurality of tooling rods 154. Although the tooling rod assembly 152 is shown having eight (8) tooling rods 154, any number of tooling rods 154 may be included in the tooling rod assembly 152. In an embodiment, the tooling rods 154 of the tooling rod assembly 152 may be oriented generally parallel to one another. However, the tooling rods 154 may be oriented at any angle relative to one another for mitigating uncontrolled wrinkle formation 112. Advantageously, the wrinkle mitigation system 150 disclosed herein may be applied to any surface over which a composite ply 104 may be formed, and is not limited to tools for forming, consolidating, and/or curing composite plies 104.

In FIG. 6, each tooling rod 154 may have an elongated shape and may be oriented along a direction that is generally parallel to uncontrolled wrinkle formation 112 in the composite ply 104 as indicated above. Each one of the tooling rods 154 has a rod width 158 (e.g., a diameter) and a rod length 156 extending between opposing rod ends 160 of the tooling rod 154. The tooling rod 154 may be provided in a rod width 158 and/or rod length 156 that results in the composite ply 104 assuming a substantially uniform corrugated shape 170 when compaction pressure 228 is applied to the composite ply 104 against the tooling rod 154. Each tooling rod 154 may preferably be formed of a relatively lightweight, low-cost material that may be formed in the desired shape. For example, the tooling rods 154 may be formed of metallic material, composite material, polymeric material, ceramic material, wood, or any other material or combination of materials.

In FIG. 6 a tooling rod 154 or a tooling rod assembly 152 may be covered by a protective film 182 to act as a barrier between the tooling rod 154 and the composite material and prevent adhesion therebetween. In an embodiment, the protective film 182 may comprise a single layer of film such as a polymer layer between the tooling rod 154 and composite ply 104. In an embodiment, the polymer layer may be chemically non-reactive with the composite ply material. For example, the polymer layer may be formed of relatively thin layer (e.g., 1 millimeter) of silicone or the polymer layer may be formed as a thin layer of fluorinated ethylene propylene (FEP), commercially available as Teflon™. In an embodiment, the protective film 182 may be configured to substantially encapsulate the tooling rod assembly 152. The protective film 182 may have film edges 184 that may function as a border for the tooling rod assembly 152 to facilitate mounting the tooling rod assembly 152 to the tool 200 such as by taping the film edges 184 to a tool surface 208.

Referring to FIG. 7, shown is a sectional view of the tooling rod assembly 152 encapsulated within a protective film 182. The protective film 182 may be configured such that the tooling rods 154 are sandwiched between layers of the protective film 182 on opposite sides of the tooling rod assembly 152. The protective film 182 may be configured such that the film edge 184 extends above and below the rod ends 160 of the tooling rods 154. The film edges 184 may be sealed together such as by adhesive bonding, heat welding, or any other means for bonding the film edges 184 together.

The protective film 182 may maintain the tooling rods 154 at a desired rod spacing 176 within the tooling rod assembly 152.

As described below, the tooling rods 154 may be spaced apart from one another at a rod spacing 176 that results in a substantially uniform distribution of excess ply material 110 in the composite ply 104. The tooling rods 154 may be oriented generally parallel to one another and may be positioned at a rod spacing 176 of between approximately 0.50 and 3.0 inch, although rod spacings 176 outside of the 0.50-3.0 inch range are contemplated. In this regard, the rod spacing 176 may be dictated by the amount of excess ply material 110 that may be measured, predicted, or calculated to occur at a given location on the tool 200.

In an embodiment, the tooling rods 154 may also be spaced apart from one another at non-uniform spacings. For example, to accommodate a fastener installation through the cured composite ply 104, the spacing between one pair of tooling rods 154 may be increased relative to the spacing between the remaining pairs of tooling rods 154. The increased spacing between the pair of tooling rods 154 may be provided to ensure that the composite material will be forced into contact with the tool surface 208 during curing of the composite ply 104. In this manner, the cured composite article will be in contact with the surface of a mating component such as at a fastener installation.

Referring to FIG. 8, shown is an embodiment of a generally elongated tooling rod 154 having a cylindrical shape 162. The tooling rod 154 has a rod length 156 extending between rod ends 160 as indicated above. Although illustrated as having a generally straight shape, the tooling rods 154 may be provided in a curved shape (not shown) that may be formed complementary to the tool surface 208 to which the tooling rod 154 may be mounted. The tooling rods 154 each have a rod width 158 or rod diameter. The rod width 158 may be dictated in part by the amount of excess ply material 110 that may occur at a given tool 200 location.

Although the tooling rods 154 in the figures are shown as having a generally high rod length 156 to rod width 158 aspect ratio of at least approximately 10, the tooling rods 154 may be provided in relatively low aspect ratio. Although not shown, the tooling rods 154 may also be provided as tooling rod segments. In an embodiment, such tooling rod segments may be disposed in end-to-end relationship with one another. Furthermore, although each one of the tooling rods 154 is shown having substantially equivalent rod widths 158 or rod diameters, tooling rods 154 of non-uniform diameter may be included in a tooling rod assembly 152.

Figure 9:
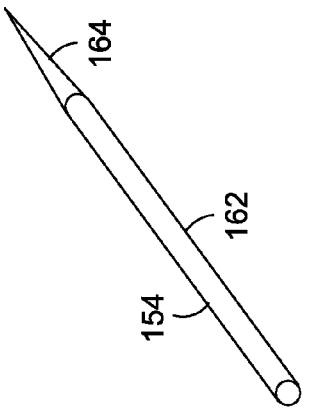
FIG. 9 is a perspective view of an embodiment of a cylindrical tooling rod having a tapered rod end.
Figure 16:
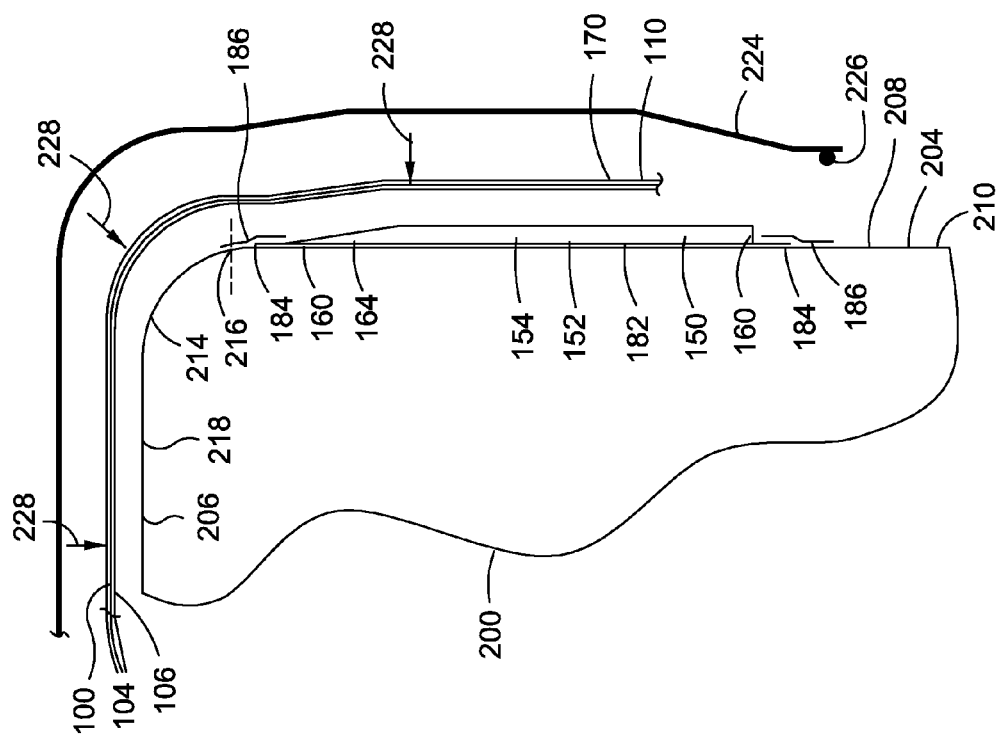
FIG. 16 is an exploded sectional side view of a composite laminate draped over the tool and partially covering the tooling rod assembly.

Referring to FIG. 9, shown is an embodiment of a tooling rod 154 having a cylindrical shape 162 with a tapered rod end 164. The tapered rod end 164 may facilitate a gradual transition of excess ply material 110 into a substantially uniform corrugated shape 170 of the composite ply 104 as illustrated in FIG. 15. In an embodiment, tooling rods 154 with tapered rod ends 164 may be positioned against the tool surface 208 such that the tapered rod end 164 is located adjacent to a corner radius 214 of the tool 200. For example, FIG. 16 illustrates a tapered rod end 164 of the tooling rod 154 disposed adjacent to a tangent 216 of the corner radius 214 in the tool surface 208.

Figure 10:
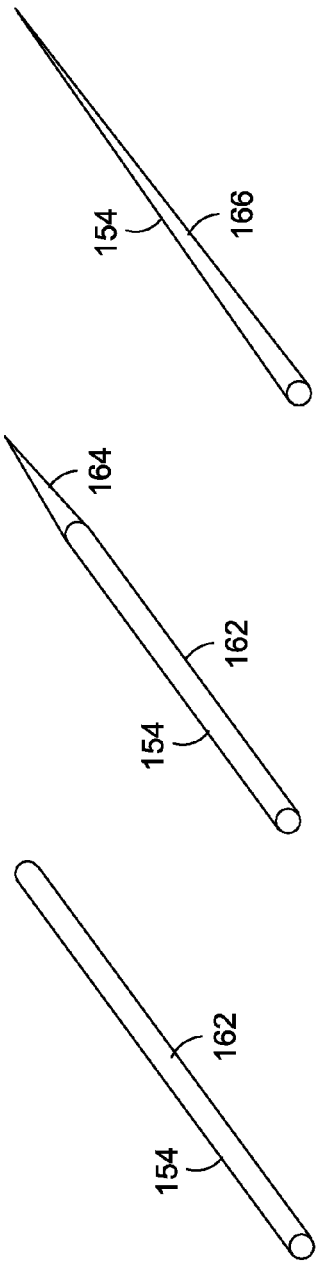
FIG. 10 is a perspective view of an embodiment of a tooling rod having a tapered shape extending along the rod length.

Referring to FIG. 10, shown is an embodiment of a tooling rod 154 having a tapered shape 166 or conical shape extending along a substantial portion of the rod length 156. The smaller diameter or pointed end of the tapered shape 166 may be positioned adjacent to the corner radius 214 of the tool surface 208. As indicated above, such a tapered shape 166 of the tooling rod 154 may facilitate a gradual transition of the excess ply material 110 into a substantially uniform corrugated shape 170.

Figure 11:
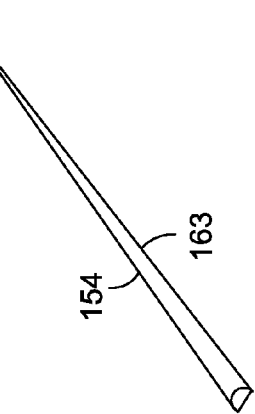
FIG. 11 is a perspective view of an embodiment of a tooling rod having a half-cone shape.

Referring to FIG. 11, shown is an embodiment of a tooling rod 154 having a half-cone shape 163 extending along a substantial portion of the rod length 156. The smaller end or pointed end of the half-cone shape 163 may be positioned adjacent to a corner radius 214 of the tool surface 208 as shown in FIG. 22 and described below. In any one of the tooling rod assembly embodiments disclosed herein, a pair of tooling rod assemblies may be positioned to sandwich the composite ply such that the tooling rods of one of the tooling rod assemblies nests in the space between the tooling rods of the a pose Ing tooling rod assembly as described below.

Figure 12:
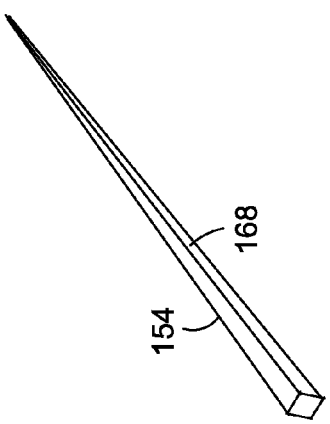
FIG. 12 is a perspective view of an embodiment of a tooling rod having a pyramidal shape.

Referring to FIG. 12, shown is an embodiment of a tooling rod 154 having a pyramidal shape 168 extending between the rod ends 160. The pyramidal shape 168 may facilitate the mounting of the tooling rods 154 against a generally flat or planar tool surface 208. In addition, the pyramidal shape 168 of the tooling rod 154 may have reduced manufacturing costs relative to the cost of manufacturing a conical or tapered tooling rod.

Figure 13:
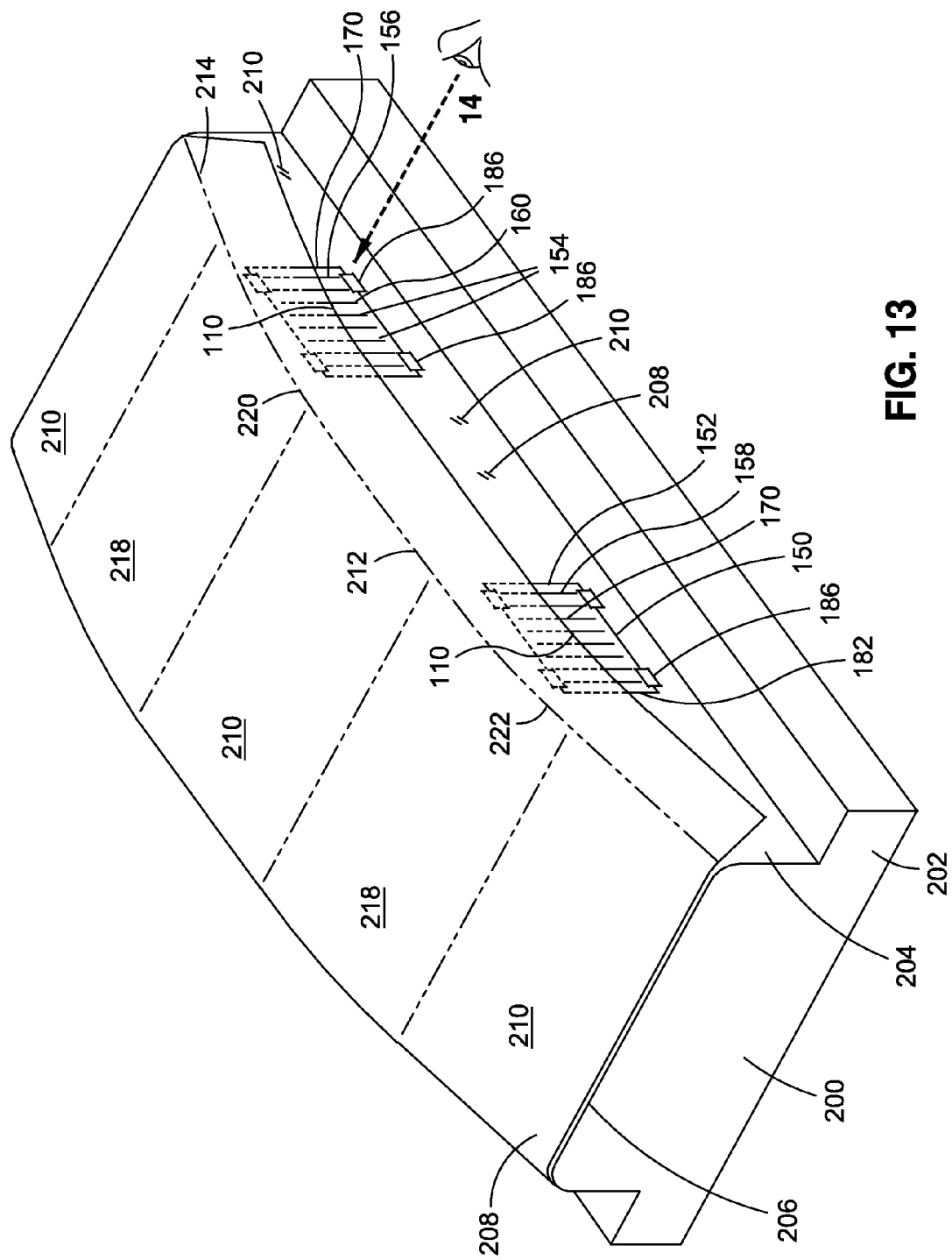
FIG. 13 is a perspective view of a composite laminate draped over a tool and partially covering the tooling rod assemblies that are mounted to the tool sides.

Referring to FIG. 13, shown is the tool 200 having a composite ply 104 or composite laminate 100 formed over the tool 200 such that the composite ply 104 at least partially covers the tooling rod assemblies 152. Each one of the tooling rod assemblies 152 may be mounted on the tool 200 proximate a region of complex curvature 220 in the tool surface 208. Although a single tooling rod assembly 152 is mounted proximate each region of complex curvature 220, a plurality of tooling rod assemblies 152 may be mounted in each region of complex curvature 220. For example, although not shown, two of the tooling rod assemblies 152 may be positioned in side-by-side relationship to one another on a tool surface 208 proximate a region of complex curvature 220. The sides of the tooling rod assemblies 152 may be spaced apart from one another such that the cured composite article includes a non-corrugated region in the space between the tooling rod assemblies 152 such as to accommodate a fastener installation or to provide a flat surface on the cured composite article for mating to another component (not shown).

Referring to FIG. 14, shown is a side view of a tooling rod assembly 152 mounted to the tool 200 and illustrating a composite laminate 100 partially covering the tooling rod assembly 152. The tooling rod assembly 152 may be mounted to the tool surface 208 by means of one or more attachment devices 186. In an embodiment, the attachment devices 186 may comprise a removable attachment device 186 such as pressure-sensitive adhesive tape. One or more strips of pressure-sensitive adhesive tape such as polymeric tape may be applied over the film edges 184 of the protective cover to releasably secure the tooling rod assembly 152 to the tool 200. However, the attachment device 186 may be provided in any configuration and is not limited to pressure-sensitive adhesive tape. For example, the attachment device 186 may comprise a mechanical feature (not shown) that may be formed into the tool surface 208 and which may be configured to engage a mating mechanical feature (not shown) that may be included with the tooling rods 154 or tooling rod assemblies 152 or which may be integrated with the protective film 182 that may cover or encapsulate a plurality of tooling rods 154 of a tooling rod assembly 152.

In FIG. 14, the tooling rod assemblies 152 are shown positioned on the tool surface 208 such that the composite ply 104 at least partially overlaps the tooling rods 154. In this regard, one or more of the tooling rods 154 in a tooling rod assembly 152 may have a rod length 156 such that a portion of the tooling rod 154 extends outwardly beyond a ply edge 108 of the composite ply 104. Positioning the tooling rods 154 such that the rod and extend below the ply edge 108 may facilitate forming the corrugated shape 170 in the area of the ply edge 108 where the greatest amount of excess material may occur. However, the tooling rod assembly 152 may be positioned on the tool 200 such that the ply edge 108 extends below (not shown) the rod ends 160. In addition, the tooling rod assemblies 152 may also be positioned on the tool 200 such that the rod ends 160 of the tooling rods 154 are located adjacent to the area in the composite ply 104 where excess ply material 110 starts forming. In this regard, the tooling rod assemblies 152 may be positioned such that the rod ends 160 are located within approximately 1 inch of a tangent 216 of a corner radius 214 in the tool surface 208 as shown in FIG. 16.

Referring to FIG. 15, shown is a sectional view of the tool 200 illustrating the corrugated shape 170 that may be formed in a composite ply 104 or composite laminate 100 by the tooling rod assembly 152. The corrugated shape 170 may include relatively small channels 172 (FIG. 15) where the composite ply 104 overlaps and/or surrounds each one of the tooling rods 154. The corrugated shape 170 of the composite ply 104 or laminate may be defined by the spacing between the tooling rods 154 and the size of the tooling rod 154 (e.g., the rod widths 158). In an embodiment, one or more of the tooling rods 154 may have a rod width 158 (e.g., a rod diameter) in the range of from approximately 0.050 to 0.25 inch. For example, a tooling rod assembly 152 may be provided with tooling rods 154 each having a rod diameter of between approximately 0.10 inch and 0.20 inch. However, the rod widths 158 may be dictated in part by the amount of excess ply material 110 that may occur at a given tool 200 location, as mentioned above. Although not shown in FIG. 15, the tooling rods 154 may be encapsulated within a protective film 182. Alternatively, the tooling rods 154 may be separately mounted to the tool 200 (not shown), and a separate layer or sheet of protective film (not shown) may be positioned between the tooling rods 154 and the composite ply 104.

In FIG. 15, the tooling rods 154 may be positioned relative to one such that the corrugated shape 170 comprises a sine wave formation 178 in the composite ply 104. In this regard, the tooling rods 154 may be sized and configured such that the corrugated shape 170 has a substantially uniform wavelength 180. In addition, the tooling rods 154 may be sized and configured to provide a substantially uniform peak-to-peak amplitude 174 within the corrugated shape 170 of the composite ply 104. Advantageously, the tooling rod 154 quantity, rod spacing 176, and rod width 158 may be selected to minimize the peak-to-peak amplitude 174 within the corrugated shape 170 of a composite ply 104. For example, a tooling rod assembly 152 may be provided with a quantity of tooling rods 154 that are sized and configured to provide a peak-to-peak amplitude 174 in the corrugated shape 170 of less than approximately 0.10 inch. By minimizing the peak-to-peak amplitude 174 in the corrugated shape 170, distortion in the fiber reinforcement of the cured composite article may be minimized which may improve the strength and stiffness of the cured composite article. The peak-to-peak amplitude 174 may be defined as the vertical distance between a trough and an adjacent peak of one of the composite plies 104 of the cured composite article.

The wrinkle mitigation system 150 and method disclosed herein may be implemented in the process of forming composite materials of any type. For example, the composite materials may include polymer matrix fiber-reinforced material 106. Such polymer matrix fiber-reinforced material 106 may include carbon fibers, glass fibers, ceramic fibers, and other types of fibers configured in a unidirectional arrangement, a woven arrangement, a chopped fiber arrangement, or any one of a variety of other fiber arrangements. The polymer matrix fiber-reinforced material 106 may include a polymer matrix such as a thermosetting matrix or a thermoplastic matrix. The polymer matrix may comprise epoxy, polyester, phenolic, ceramic, or other matrix materials. The polymer matrix fiber-reinforced material 106 may comprise a dry fiber preform that may be applied over a tool 200 followed by the introduction of resin into the dry fiber preforms by a resin infusion process such as resin film infusion (RFI), resin transfer molding (RTM), or other processes. The polymer matrix fiber-reinforced material 106 may also comprise pre-impregnated fiber-reinforced polymeric material (e.g., pre-preg) as mentioned above.

Referring to FIG. 16, shown is an exploded sectional side view of a composite laminate 100 draped over the tool 200 and partially covering the tooling rod assembly 152. The tooling rod assembly 152 may be mounted to the tool 200 by means of one or more attachment devices 186 such as pressure-sensitive adhesive tape. The tape may be applied to the film edges 184 for bonding to the tool surface 208. The tooling rod assembly 152 may be positioned on the tool surface 208 such that the upper rod end 160 is within a predetermined distance of the tangent 216 of the corner radius 214. The upper rod end 160 may be tapered to accommodate a gradual increase in the amount of excess material that occurs along a direction toward the ply edge. In this regard, the maximum amount of excess ply material may be at a minimum at the corner radius 214 and a maximum at the ply edge 108.

In FIG. 16, the tooling rod assembly 152 may be configured and positioned such that the tooling rods 154 extend beyond the ply edge 108 as mentioned above. A plurality of composite plies 104 may be formed over or applied to the tool 200 to achieve a desired thickness of a composite laminate 100. A vacuum bag 224 may be sealingly applied over the composite laminate 100 and tooling rod assemblies 152 using a bag edge sealant 226. A vacuum (not shown) may be drawn on the vacuum bag 224 and internal compaction pressure 228 may be applied to the composite laminate 100 to force the composite plies 104 into a corrugated shape 170 as shown in FIG. 15.

Figure 17:
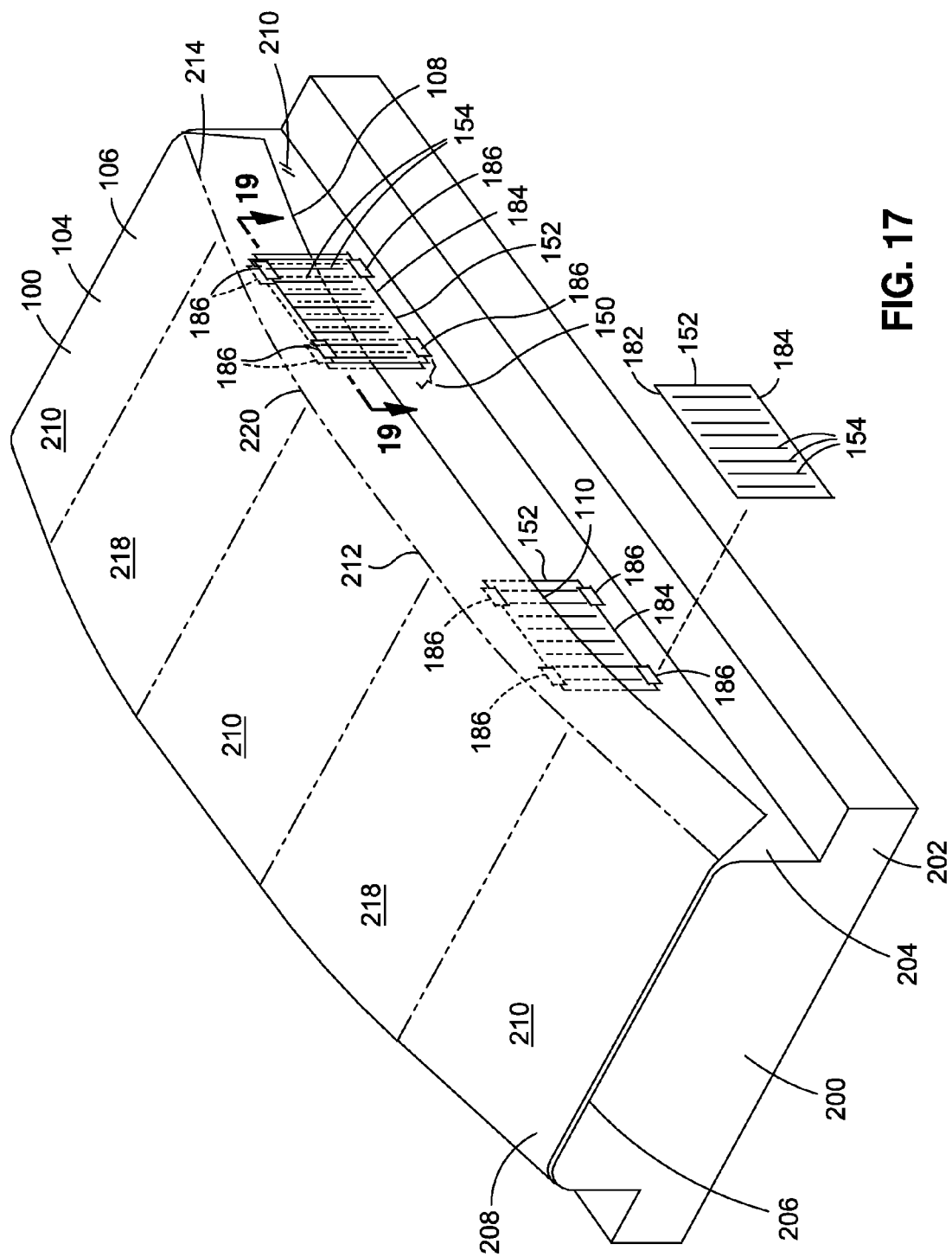
FIG. 17 is a perspective view of the tool illustrating an embodiment of the wrinkle mitigation system comprising a pair of the tooling rod assemblies for sandwiching a composite laminate therebetween.

Referring to FIG. 17, shown is an alternative embodiment of the wrinkle mitigation system 150 for generating a corrugated shape 170 in a composite ply 104 or composite laminate 100. At one or more locations on the tool 200, a pair of tooling rod assemblies 152 may be positioned on opposite sides of the composite ply 104 or composite laminate 100. The tooling rods 154 of one of the tooling rod assemblies 152 may be positioned to nest within the spaces between the tooling rods 154 of the opposing tooling rod assembly 152 as shown in FIGS. 19-22 described below. One of the tooling rod assemblies 152 may be mounted on the tool 200 such as adjacent to a region of complex curvature 220 such that the composite ply 104 or composite laminate 100 at least partially overlaps the tooling rod assembly 152.

In FIG. 17, the mating the tooling rod assembly 152 may be mounted over the composite ply 104 or composite laminate 100 in general registration with the tooling rod assembly 152 that is mounted to the tool 200. In this manner, the pair of tooling rod assemblies 152 may cooperate to force the composite ply 104 into a corrugated shape 170 to increase wrinkle mitigation. The tooling rod assembly 152 may be mounted over the composite laminate 100 using an attachment device 186 such as tape for securing individual tooling rods 154 or the film edges 184 of a tooling rod assembly 152 to the composite ply 104 or to a protective layer (not shown) that may be applied over the composite ply 104 or composite laminate 100.

Referring to FIG. 18, shown is a sectional view illustrating the pair of tooling rod assemblies 152 and a composite laminate 100 positioned therebetween prior to the application of compaction pressure 228 (FIG. 22) to the composite laminate 100. The tooling rod assemblies 152 may be positioned relative to one another such that the tooling rods 154 of one of the tooling rod assemblies 152 are aligned with the spaces between the tooling rods 154 of the opposing tooling rod assembly 152. A vacuum bag 224 (FIG. 22) may be applied over the pair of tooling rod assemblies 152 and composite laminate 100.

Referring to FIG. 19, shown is a sectional view of the tool 200 illustrating the corrugated shape 170 formed in the composite laminate 100 by the opposing pair of tooling rod assemblies 152. When compaction pressure 228 is applied such as by drawing a vacuum on the vacuum bag 224 applied over the tooling rod assemblies 152, the tooling rods 154 may force the composite laminate 100 toward the tool surface 208. In this manner, the tooling rod assemblies 152 may cooperate to increase the wrinkle mitigation capability of the wrinkle mitigation system 150.

Referring to FIG. 20-21, shown are sectional views of the tool 200 and a pair of tooling rod assemblies 152 with the composite laminate 100 positioned between the tooling rod assemblies 152 similar to the arrangement shown in FIGS. 18-19. The tooling rod assemblies 152 have a half-cone shape 163 which may facilitate the mounting of the tooling rods 154 to the tool surface 208. In addition, the half-cone shape 163 of the tooling rods 154 may facilitate vacuum bagging for applying compaction pressure to force the composite laminate 100 toward the tool surface in the space between each one of the tooling rods 154.

Referring to FIG. 22, shown is a partially exploded sectional side view of the tool 200 having a pair of tooling rod assemblies 152 positioned on opposite sides of a composite laminate 100. One of the tooling rod assemblies 152 may be mounted to the tool 200 by means of one or more attachment devices 186 such as pressure-sensitive adhesive tape as indicated above. The composite laminate may be applied over the tooling rod assembly 152. An additional tooling rod assembly 152 may be applied over the composite laminate 100 such that the composite-mounted tooling rod assembly 152 is in general registration with the tool-mounted tooling rod assembly 152 wherein the tooling rods 154 nest between one another as illustrated in FIGS. 18-21.

In FIG. 22, the laminate-mounted tooling rod assembly 152 may be secured in place using one or more attachment devices 186 (e.g. tape) as described above. A vacuum bag 224 may be applied over the tooling rod assemblies 152 and the composite laminate 100. The vacuum bag 224 may be sealed to the tool 200 using a bag edge sealant 226. A vacuum may be drawn on the vacuum bag 224 and internal compaction pressure 228 may be applied to force the tooling rod assemblies 152 together causing the composite laminate 100 to assume the corrugated shape 170 shown in FIGS. 19 and 21.

Figure 23:
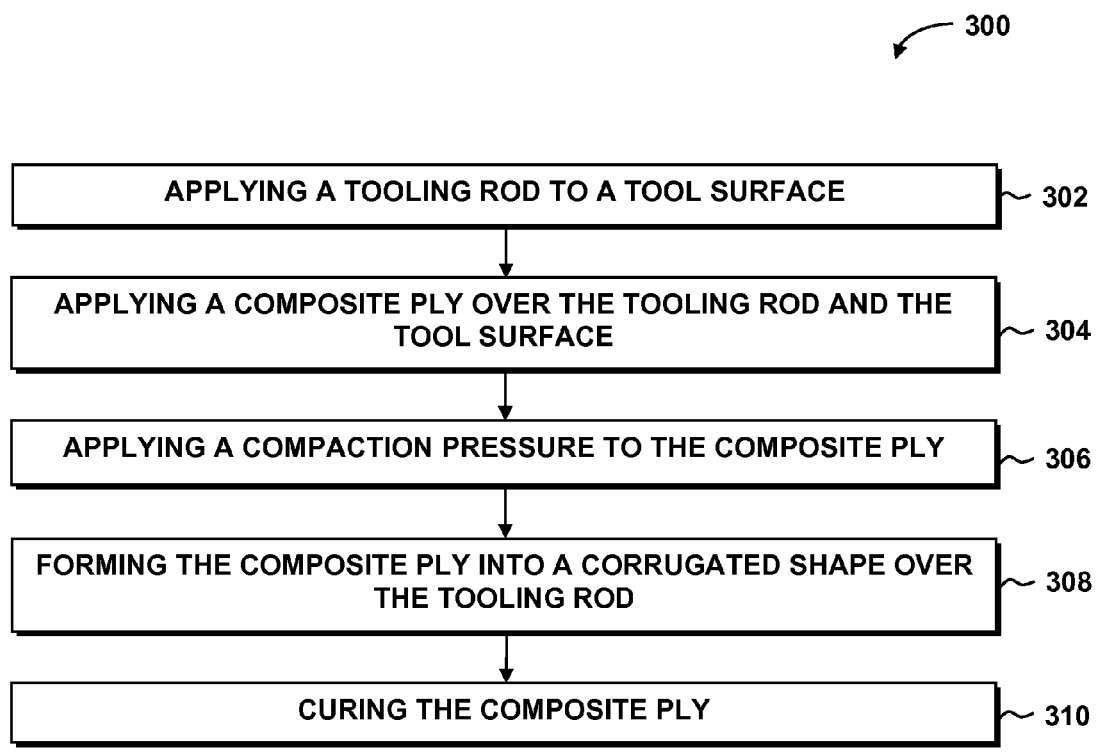
FIG. 23 is a flow diagram illustrating one or more operations that may be included in a method of controlling wrinkle formation in a composite laminate.

Referring to FIG. 23, shown is a flow diagram having one or more operations that may be included in a method 300 for mitigating wrinkle formation in a composite ply 104 or composite laminate 100. Advantageously, the method implements the use of one or more wrinkle mitigation systems 150 comprising one or more tooling rods 154 that may be disposed on a tool surface 208 for controlling the distribution of excess ply material 110 in a composite ply 104.

Step 302 of the method 300 of FIG. 23 may include applying at least one tooling rod 154 to a tool surface 208. As shown in FIG. 14, the tooling rod assembly 152 may have a plurality of tooling rods 154 that may be removably mounted to the tool surface 208 of the tool 200. In this regard, Step 302 may further include removably attaching the tooling rod 154 to the tool surface 208 using at least one attachment device 186 such as pressure-sensitive adhesive tape that may be applied over the film edges 184 of the protective film 182. The method may include applying one or more tooling rods 154 adjacent to regions of complex curvature 220. However, in an alternative embodiment, the method may include integrally forming the tooling rods 154 with the tool surface 208 such as by machining the tooling rods 154 into the tool surface 208 or molding the tooling rods 154 into the tool surface 208 as mentioned above. The method may include applying a protective film 182 over the tooling rod 154 prior to applying the composite ply 104 over the tool 200. The protective film 182 may act as a barrier between the tooling rods 154 and the composite ply 104.

The quantity of tooling rods 154 may be selected based upon the amount of excess material that may be expected to occur at a given location. The tooling rod assembly 152 may be sized and configured such that a corrugated shape 170 is formed in the composite ply 104 or composite laminate 100. In an embodiment, the tooling rods 154 may be provided at a substantially uniform spacing resulting in a corrugated shape 170 that provides substantially uniform distribution of excess ply material 110 of the composite ply 104. The method may include spacing the tooling rods 154 at a rod spacing 176 of between approximately 0.50 and 3.0 inch although the rods may be provided at any rod spacing.

The method may further include positioning a tooling rod 154 such that a rod end 160 is located within approximately 1 inch of a tangent 216 of a corner radius 214 in the tool surface 208. Step 302 of the method 300 of FIG. 23 may include positioning the tooling rod 154 in a rod length 156 such that a portion of the tooling rod 154 extends outwardly beyond a ply edge 108 of the composite ply 104. The method may further include orienting the tooling rods 154 generally parallel with one another as illustrated in FIG. 14. However, the tooling rods 154 may be oriented in any relation to one another and are not limited to a parallel orientation.

The tooling rod assembly 152 may be sized and configured in a manner that minimizes the peak-to-peak amplitude 174 in a composite ply 104 as mentioned above. For example, the method may include sizing the tooling rods 154 to provide a peak-to-peak amplitude 174 of less than approximately 0.10 inch in a composite ply 104. In addition, the method may include sizing the tooling rod 154 in a rod width 158 that substantially eliminates the occurrence of uncontrolled wrinkle formation 112 in the composite ply 104 when compaction pressure 228 is applied to the composite ply 104. In this regard, the wrinkle mitigation system 150 advantageously provides for a substantially uniform distribution of excess ply material 110 within a corrugated shape 170 formed in the composite ply 104 or composite laminate 100.

Step 304 of the method 300 of FIG. 23 may include applying (e.g., draping) a composite ply 104 over the tooling rod 154 and the tool surface 208. In an embodiment, the method may preferably include hand layup of composite plies 104 over the tool 200 and tooling rod assemblies 152. However, the method may include the use of automated tape laying machinery such as a contoured tape laying machine for automated layup of composite plies 104 over the tool 200 and over the tooling rod assemblies 152 that may be mounted to the tool 200. In a further embodiment, a composite-mounted tooling rod assembly 152 may be applied over the composite laminate in general registration with a tool-mounted tooling rod assembly 152 as shown in FIG. 17. The tooling rod assemblies may cooperate to force the composite laminate into a corrugated shape (FIGS. 19 and 21) for improved wrinkle mitigation.

Step 306 of the method 300 of FIG. 23 may include applying compaction pressure 228 (FIG. 16) to the composite ply 104. In this regard, after the tooling rod assemblies 152 are mounted to the tool 200 and the desired quantity of composite plies 104 are formed over the tool surface 208 and the tooling rod assemblies 152, the vacuum bag 224 may be applied over the composite plies 104 to provide a gas barrier for drawing a vacuum (not shown). The drawing of the vacuum may result in the application of internal compaction pressure 228 on the composite plies 104 against the tool surface 208 and tooling rods 154.

Step 308 of the method 300 of FIG. 23 may include forming at least a portion of the composite ply 104 into a corrugated shape 170 over the tooling rods 154 as illustrated in FIG. 15. The corrugated shape 170 may substantially duplicate the size and spacing between them tooling rods 154. Advantageously, the corrugated shape 170 may cause excess ply material 110 to be distributed in a generally uniform manner. In this manner, the wrinkle mitigation system 150 provides a means for controlling excess ply material 110 by forming a plurality of significantly smaller size wrinkle instead of several relatively large uncontrolled pleats or folds (FIG. 3) that may occur without the wrinkle mitigation system 150.

Step 310 of the method 300 of FIG. 23 may include removing the tooling rod assemblies 152 from the tool surface 208 after forming the composite ply 104 or composite laminate 100 into the corrugated shape 170. The corrugated shape 170 may include relatively small channels 172 (FIG. 15) where the composite ply 104 overlaps or surrounds each one of the tooling rods 154. Step 310 may include the application of heat and/or additional compaction pressure 228 on the composite ply 104 during curing of the composite laminate 100 which may result in the channels 172 at least partially flattening to reduce the corrugation height which may minimize distortion of the fiber reinforcement of the cured composite article.

Advantageously, the system and method disclosed herein may provide a means for forming any one of a variety of sizes and configurations of composite articles having irregular shapes or with complex curvatures. In an embodiment, the composite article may comprise a structural component 102 such as a structural component of an aircraft. The structural component may comprise a component of an aircraft wing, an aircraft fuselage, an aircraft control surface, an engine nacelle, a spar, a rib, a frame, a stiffener, or any other structural component, without limitation. The wrinkle mitigation system 150 and method disclosed herein advantageously provides a low-cost solution to controlling wrinkle size and location which may improve the strength and performance of the cured composite article.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of controlling wrinkle formation in a composite laminate, comprising the steps of:
   providing a tooling rod assembly including a plurality of tooling rods protruding above a tool surface on a tool side of a tool at a location adjacent to a juncture of the side with a contoured surface of the tool, the plurality of tooling rods having a lengthwise direction oriented locally parallel to the tool surface, the tooling rod assembly being one of:
   mounted to the tool surface;
   integral with the tool surface;
   applying two or more composite plies over the tooling rod assembly and the tool surface such that an entirety of the tooling rod assembly is located immediately adjacent the tool surface on a side of the two or more composite plies facing the tool surface and such that at least one of the composite plies is in direct physical contact with the plurality of tooling rods;
   applying a compaction pressure to the two or more composite plies against the plurality of tooling rods and against the tool surface; and
   forming the two or more composite plies into a corrugated shape over the plurality of tooling rods with no tooling rods located between the two or more composite plies, the tooling rod assembly controlling wrinkle formation in the two or more composite plies, the tooling rod assembly being stationary relative to the tool surface during formation of the two or more composite plies into the corrugated shape having a plurality of corrugations.

2. The method of claim 1, further including:
   removing the tooling rod assembly from the tool surface after forming the two or more composite plies into the corrugated shape; and
   curing the two or more composite plies.

3. The method of claim 1, wherein the step of providing the tooling rod assembly includes:
   removably attaching the tooling rod assembly to the tool surface using at least one attachment device.

4. The method of claim 1, further comprising the step of:
   sizing one or more of the plurality of tooling rods of the tooling rod assembly in a rod width that substantially eliminates uncontrolled wrinkle formation in the two or more composite plies when the compaction pressure is applied to the two or more composite plies.

5. The method of claim 1, further comprising the step of:
   applying a protective film over the tooling rod assembly prior to applying the two or more composite plies over the tooling rod assembly.

6. The method of claim 1, wherein the step of providing the tooling rod assembly with the tool surface comprises:
   applying the tooling rod assembly adjacent to a complex curvature in the tool surface.

7. The method of claim 1, further comprising the step of:
   spacing the-plurality of tooling rods of the tooling rod assembly at a rod spacing of between approximately 0.50 and 3.0 inch.

8. The method of claim 3, wherein:
   the attachment device is pressure-sensitive adhesive tape.

9. The method of claim 1, wherein the step of providing the tooling rod assembly with the tool surface comprises at least one of the following:
   machining the tooling rod assembly into the tool surface;
   molding the tooling rod assembly into the tool surface.

10. The method of claim 1, further comprising:
    positioning the tooling rod assembly on the tool surface such that a portion of at least one of the plurality of tooling rods of the tooling rod assembly extends outwardly beyond a ply edge of the two or more composite plies.

11. The method of claim 1, further comprising:
    positioning the tooling rod assembly on the tool surface at a location where excess ply material gathers.

12. The method of claim 11, further comprising:
    uniformly distributing the excess ply material within the corrugated shape.

13. The method of claim 1, further comprising:
    providing at least one of the plurality of tooling rods of the tooling rod assembly in at least one of the following shapes: a tapered shape, a cylindrical shape having a tapered rod end.

14. The method of claim 13, further comprising:
    providing at least one of the plurality of tooling rods of the tooling rod assembly in a rod width in a range of from approximately 0.050 to 0.25 inch.

15. The method of claim 1, further comprising:
    providing at least one of the plurality of tooling rods of the tooling rod assembly in a rod width resulting in a peak-to-peak amplitude of less than approximately 0.10 inch in the two or more composite plies.

16. The method of claim 1, further comprising:
    providing at least one of the plurality of tooling rods of the tooling rod assembly in a rod length to rod width aspect ratio of at least 10.

17. The method of claim 1, further comprising:
    orienting the plurality of tooling rods of the tooling rod assembly parallel to one another.

18. The method of claim 17, further comprising:
    positioning at least one of the plurality of tooling rod of the tooling rod assembly such that a rod end is located within approximately 1 inch of a tangent of a corner radius in the tool surface.

19. The method of claim 1, wherein the tooling rod assembly immediately adjacent to the tool surface comprises a tool-mounted tooling rod assembly, the method further including:
    applying a composite-mounted tooling rod assembly over the two or more composite plies to sandwich the two or more composite plies between the composite-mounted tooling rod assembly and the tool-mounted tooling rod assembly.

20. A method of controlling wrinkle formation in a composite laminate, comprising the steps of:
    mounting a tooling rod assembly including a plurality of tooling rods to a tool surface in a manner such that the plurality of tooling rods protrude above the tool surface on a tool side of a tool at a location adjacent to a juncture of the tool side with a contoured surface of the tool, the plurality of tooling rods having a lengthwise direction oriented locally parallel to the tool surface;
    laying up a plurality of composite plies over the tooling rod assembly and the tool surface such that an entirety of the tooling rod assembly is located immediately adjacent the tool surface on a side of the plurality of composite plies facing the tool surface and such that at least one of the composite plies is in direct physical contact with the plurality of tooling rods;
    applying a compaction pressure to the plurality of composite plies against the plurality of tooling rods and against the tool surface; and forming the plurality of composite plies into a corrugated shape over the plurality of tooling rods with none of the plurality of tooling rods being located between the plurality of composite plies, the tooling rod assembly controlling wrinkle formation in the plurality of composite plies, the tooling rod assembly being stationary relative to the tool surface during formation of the plurality of composite plies into the corrugated shape having a plurality of corrugations.

21. The method of claim 20, wherein the step of mounting the tooling rod assembly to the tool surface comprises:
removably attaching the tooling rod assembly to the tool surface using pressure-sensitive adhesive tape.

22. The method of claim 1, wherein the step of mounting the tooling rod assembly to the tool surface comprises:
mounting the tooling rod assembly against a planar tool surface.

23. The method of claim 1, wherein the step of mounting the tooling rod assembly to the tool surface comprises:
mounting two tooling rod assemblies in spaced-apart side-by-side relationship to one another on the tool surface.

24. The method of claim 1, wherein:
the corrugated shape comprises a sine wave formation in the two or more composite plies.

25. The method of claim 1, wherein the step of applying two or more composite plies over the tooling rod assembly and the tool surface includes:
laying up the two or more composite plies by hand.

26. The method of claim 1, wherein the step of applying two or more composite plies over the tooling rod assembly and the tool surface includes:
laying up the two or more composite plies using automated tape laying machinery.

27. The method of claim 1, further comprising:
applying a vacuum bag over the tooling rod assembly and the two or more composite plies;
sealing the vacuum bag to the tool; and
drawing a vacuum on the vacuum bag to cause the compaction pressure to be applied to the two or more composite plies.

* * * * *